US008972913B1

(12) United States Patent
Samoylov (10) Patent No.: US 8,972,913 B1
(45) Date of Patent: Mar. 3, 2015

(54) CONCURRENT MULTIPARAMETER SIMULATION SYSTEM (71) Applicant: Invarian, Inc., Santa Clara, CA (US)

(72) Inventor: Aleksandr Samoylov, Cupertino, CA (US)

(73) Assignee: Invarian, Inc., Santa Clara, CA (US)

( * ) Notice: Subject to any disclaimer, the term of this patent is extended or adjusted under 35 U.S.C. 154(b) by 0 days.

(21) Appl. No.: 14/012,710

(22) Filed: Aug. 28, 2013

Related U.S. Application Data (60) Provisional application No. 61/694,705, filed on Aug. 29, 2012.

(51) Int. Cl.
G06F 17/50 (2006.01)
(52) U.S. Cl.
CPC .................... G06F 17/5009 (2013.01)
USPC .............. 716/100; 716/106; 716/136; 703/14
(58) Field of Classification Search
CPC ............ G06F 17/5009; G06F 17/5022; G06F 17/5027; G06F 17/5036; G06F 2217/86
USPC ........................ 703/14–15; 716/100–101, 106
See application file for complete search history.

(56) References Cited

U.S. PATENT DOCUMENTS

2003/0182639 A1* 9/2003 Lehner et al. ..................... 716/4

* cited by examiner

Primary Examiner — Paul Dinh
(74) Attorney, Agent, or Firm — Fenwick & West LLP (57) ABSTRACT

A system and a method are disclosed for concurrently simulating multiple parameters of a design of an electrical circuit. A first simulation time and a first set of environmental parameters is determined and the design is simulated for the determined first simulation time. Multiple simulation engines, each analyzing on simulation parameter, simulate the design based on the first set of environmental parameters and the first set of environmental parameters are updated based on the results of each of the simulation engines. A determination is made whether the simulation results have converged. If the simulation results have not converged, each of the analysis engines simulated the design using the updated set of environmental parameters. If the simulation results are determined to be convergent, the simulation system determines a second simulation time and repeats the simulation process for the second simulation time.

20 Claims, 5 Drawing Sheets

CONCURRENT MULTIPARAMETER SIMULATION SYSTEM

CROSS REFERENCE TO RELATED APPLICATIONS

This application claims the benefit of U.S. Provisional Application No. 61/694,705, filed Aug. 29, 2012, which is incorporated by reference in its entirety.

BACKGROUND

1. Field of Art

The disclosure generally relates to the field of electrical circuit simulations, and more specifically to concurrent, multi-parameter analysis of electrical circuits.

2. Description of the Related Art

As the complexity of electrical and electronic circuits increase, the tools used for their simulation also increase in complexity. Furthermore, due to the complexity of the simulations, and to increase the simulation speed, current analysis tools specialize in one aspect of the electrical circuit while considering other aspects of the electrical circuit as being constant. For instance, a timing analysis tool may be able to determine the delay of the different components of the electrical circuit but the timing analysis tool may consider some parameters that affect timing, such as the temperature of the electrical circuit to be constant. This reduces the accuracy of the analysis tools since parameters that are considered to be constant may actually be changing with the operation of the electrical circuit.

To simulate multiple parameters of the electrical circuit, users may use multiple analysis tools, each simulating one parameter of the electrical circuit. For instance, a user may use a voltage analysis tool, as well as a thermal analysis tool to simulate the voltage at different nodes of the electrical circuit and the temperature profile of the electrical circuit. Since every parameter is analyzed independently to each other, analyzing the temperature profile of the electrical circuit does not necessarily improve the accuracy of the voltage simulation.

SUMMARY

Embodiments of the invention present a new way for concurrently simulating multiple operating parameters of a design of an electrical circuit. The simulation system includes multiple analysis engines, each simulation engine capable of simulating one parameter of the electrical circuit. The simulation system determines a first simulation time for which to perform the analysis of the design. The simulation system also determines a first set of environmental parameters for the design. Each of the analysis engines simulates the design based on the first set of environmental parameters. Based on the results from each of the analysis engines, the first set of environmental parameters is updated.

A determination is made whether the simulation results have converged. If the simulation results have not converged, each of the analysis engines simulates the design using the updated set of environmental parameters representing simulation of the same simulation time. Otherwise, if the simulation results are determined to be convergent, the simulation system determines a second simulation time and repeats the simulation process for a second simulation time.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Computing Machine Architecture

Figure 1:
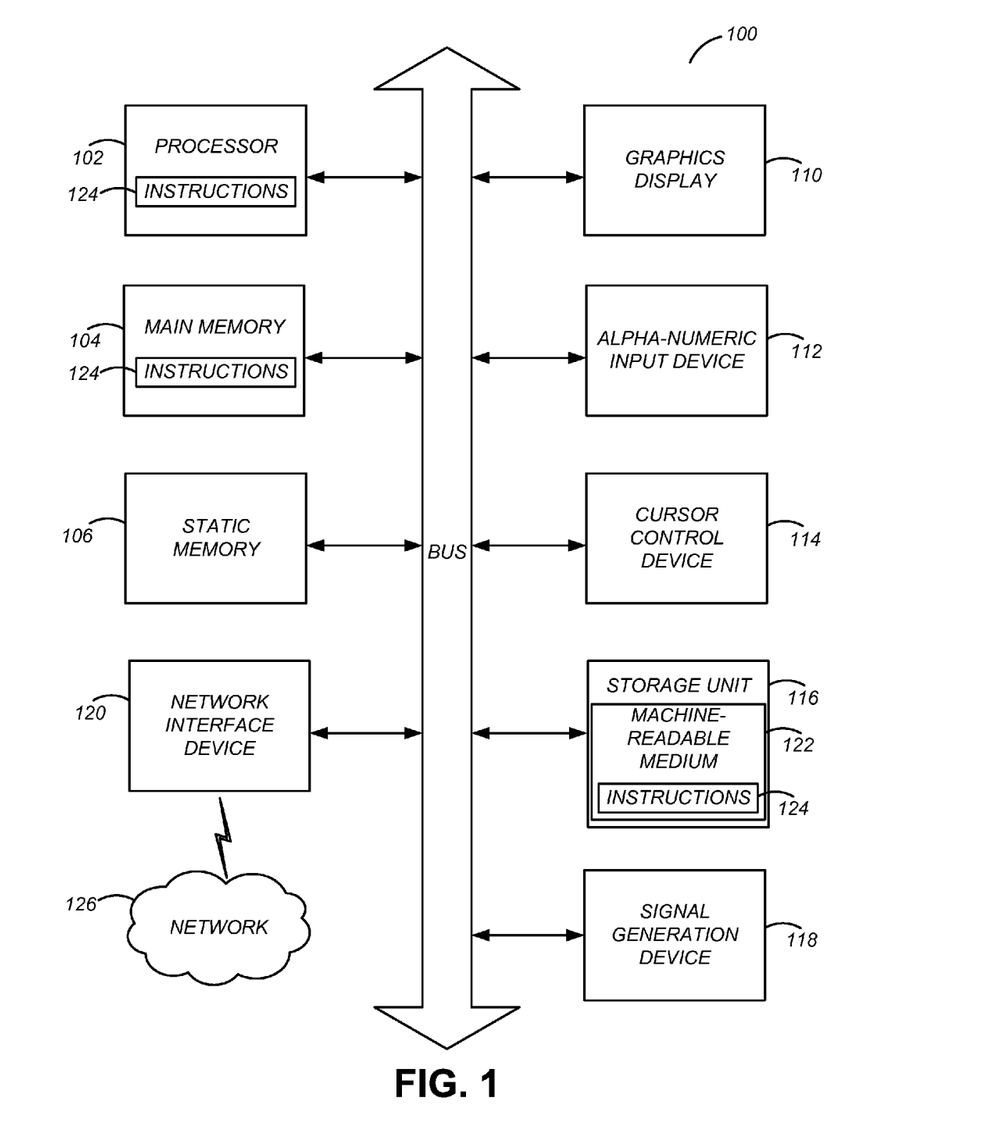
FIG. 1 illustrates one embodiment of components of an example machine able to read instructions from a machine-readable medium and execute them in a processor.

FIG. (FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a personal digital assistant (PDA), a cellular telephone, a smartphone, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 820, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Electrical Circuit Analysis Architecture

Figure 2A:
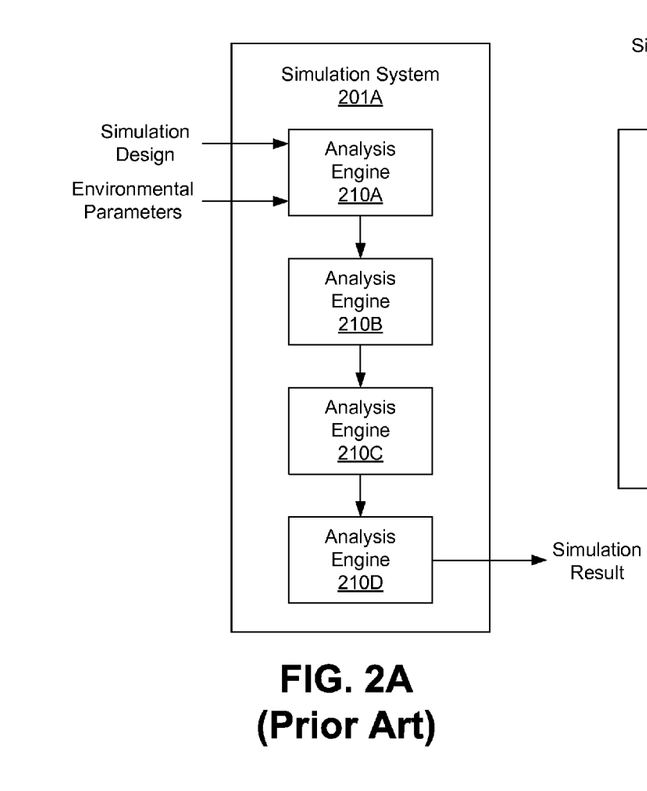
FIG. 2A illustrates a conventional simulation system for simulating multiple operating parameters of an electrical circuit.

FIG. 2A illustrates a conventional simulation system 201A for simulating multiple operating parameters. The simulation system 201A receives a simulation design and a set of environmental parameters, and outputs a simulation result. Simulation System 201 includes analysis engine 210A, analysis engine 210B, analysis engine 210C, and analysis engine 210D. For illustration purposes, FIG. 2A contains four analysis engines, but it could contain more analysis engines or less analysis engines depending on the number of operating parameters to be simulated.

Each analysis engine calculates one operating parameter for the simulation design. For example, an analysis engine may perform timing analysis, power analysis, voltage/current analysis, temperature analysis, parasitic RLC analysis, etc. The analysis engines 210 calculate their respective simulation parameters based on a set of environmental parameters.

As used herein, environmental parameters of an analysis engine are a set of parameters that are not computed by the analysis engine as part of the simulation. The environmental parameters may, for example, be provided to the analysis engine as an input by the user running a simulation or by a simulation engine invoking the analysis engine. For a given analysis engine, during the simulation of a design, the environmental parameters are kept constant, while the simulation parameters are being computed. For instance, for a thermal analysis engine, the timing, voltage, current, and power of a circuit design may be kept constant while computing the temperature profile throughout the circuit. Thus, for the thermal analysis engine, the timing, voltage, current, and power are environmental parameters.

The analysis engines 210 of FIG. 2A compute their respective operating parameters sequentially and the output of an analysis engine is used as an input to the next analysis engine. For instance, the first analysis engine 210A (e.g., timing analysis) computes a first operating parameter (e.g., timing) assuming the environmental parameters (e.g., voltage, current, temperature profile, etc.) to be constant. After the first analysis engine 210A finished computing the first operating parameter, the second analysis engine 210B (e.g., temperature analysis) computes a second operating parameter (e.g., temperature) based on the results from the first analysis engine 210A. The results from the first analysis engine 210A and the second analysis engine 210B are used as an input to the third analysis engine 210C. This process is repeated until every analysis engine 210 has finished computing its respective operating parameter.

Even though analysis engines 210 compute their respective simulation parameters assuming their environmental parameters being constant, in reality the environmental parameters may not be constant. For example, as current passes though an electrical circuit, the temperature of the different components of the electrical circuit may increase. As a result, the properties of those components (e.g., electron/hole mobility, electron/hole free mean path, resistivity of a metal layer) may also change. Since analysis engines that have temperature profile as an environmental parameter (e.g., timing analysis engine, power analysis engine, etc.) do not take into consideration the change in temperature as the circuit is being operated, the simulation results obtained from those analysis engines may not be accurate.

Figure 5:
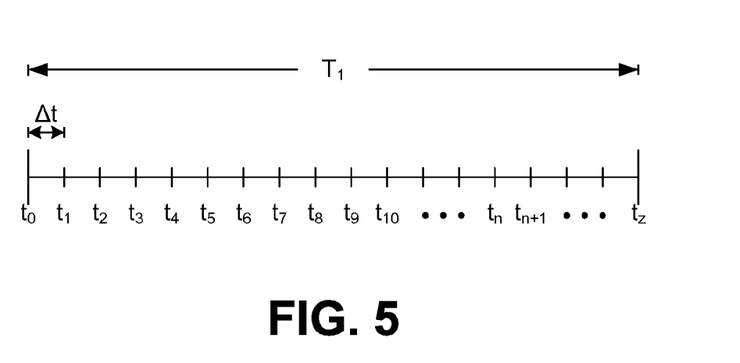
FIG. 5 illustrates a timing diagram of a simulation according to one embodiment.

FIG. 5 illustrates a timing diagram of a simulation. Each simulation may be performed for a first time interval $T_1$ (e.g., 10 ms). That is, the electrical circuit is simulated for an operating time of $T_1$. To simulate the behavior of the electrical circuit, the first time interval $T_1$ is divided into multiple sub-time intervals $t_0, t_1, t_2, \ldots, t_z$, separated by $\Delta t$ (e.g., 1 µs). In some analysis engines, $\Delta t$ may be constant throughout the entire simulation. In other analysis engines, $\Delta t$ may change depending on different factors (e.g., precision needed by user, convergence of simulation).

Even though FIG. 5 is described in terms of simulation times, a simulation does not have to be perform as a function of time. As used herein, a simulation time is any parameter that is varied (or swept) during the simulation to determine the behavior of the electrical circuit as a function of varying parameter. For instance a simulation may be performed as a function of the supply voltage (e.g., supply voltage ranging from 1V to 5V). Here, the first simulation time refers to the first supply voltage simulated (e.g., 1V), the last simulation time refers to the last supply voltage simulated (e.g., 5V), and $\Delta t$ refers to a voltage step (e.g., 0.1V) used to sweep the supply voltage from the first voltage level (1V) to the last voltage level (5V).

Figure 3A:
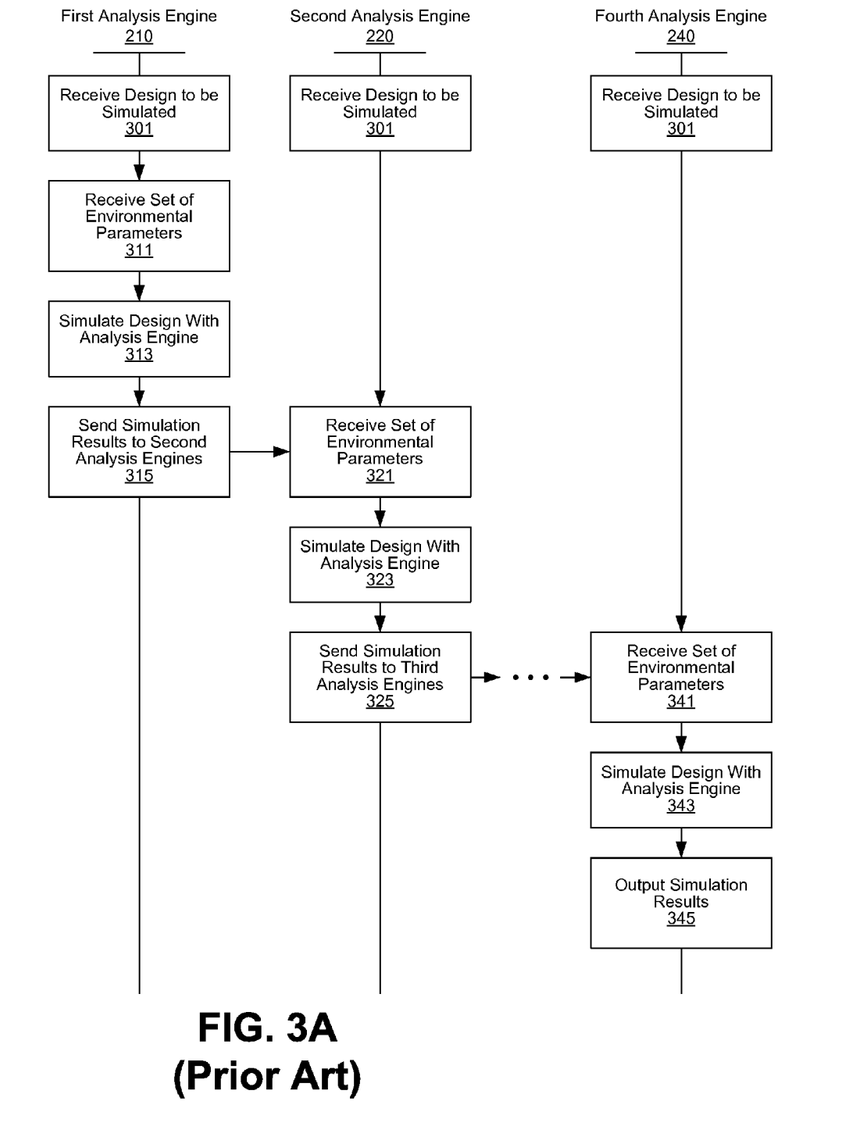
FIG. 3A illustrates a flow diagram for simulating multiple operating parameters.

FIG. 3A illustrates a flow diagram for simulating multiple operating parameters by a conventional simulation system 201A. The first analysis engine 210A receives 301 the design to be simulated and 311 a set of environmental parameters. In some embodiments, one or more environmental parameters may be received from a user using the simulation system 201A. In other embodiments, a default value may be used for environmental parameters that are not received. The first analysis engine 210A simulates 313 the design starting from the first simulation time $t_0$ until the last simulation time $t_z$ of FIG. 5, and sends the results of the simulation to the second simulation engine.

The second analysis engine 210B receives 301 the design to be simulated. Additionally, the second analysis engine 210B receives 321 the simulation results from the first analysis engine and the environmental parameters previously received by the first analysis engine. In some embodiments, the first analysis engine 210A updates the environmental parameters to include the results of the first analysis and sends the updated environmental parameters to the second analysis engine. The second simulation engine 210B simulates 323 the design starting again from the first simulation time $t_0$ and ending at the last simulation time $t_z$ of FIG. 5. The second analysis engine and sends 325 the results of the design and the environmental parameters to the third analysis engine 210C.

This process is repeated for every analysis engine 210 used by the simulation system 201A. After the last analysis engine (e.g., fourth simulation engine 210D) received 341 the set of environmental parameters, the last parameter is simulated 343 and the simulation results is outputted 345.

Figure 3B:
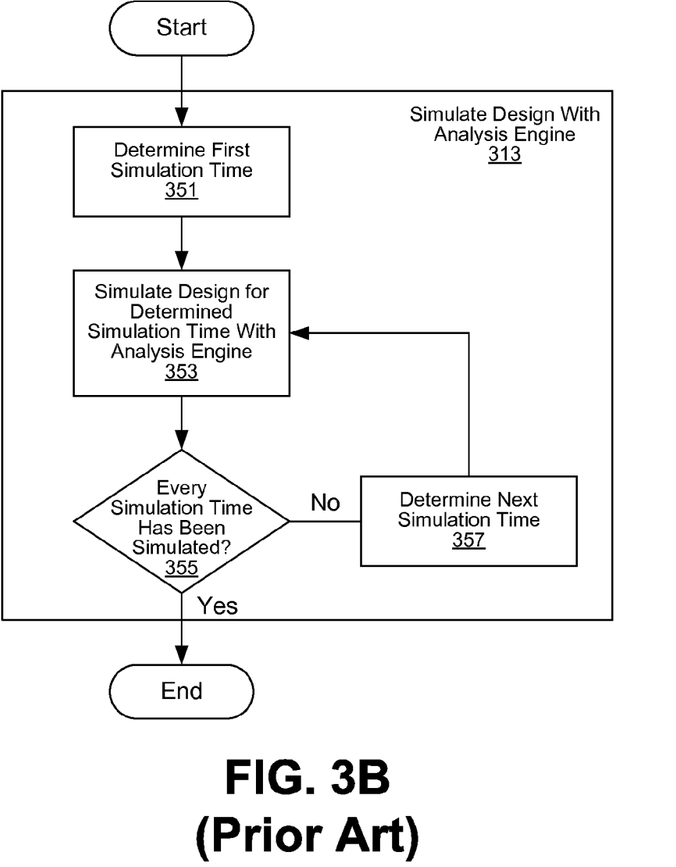
FIG. 3B illustrates a flow diagram for simulating a single operating parameter.

FIG. 3B illustrates a flow diagram for simulating one operating parameter by an analysis engine 210. The analysis engine 210 determines 351 the first simulation time ($t_0$ of FIG. 5). The simulation engine 210 simulates 353 the design for the determined first simulation time $t_0$. After the simulation of the design for $t_0$ has been completed, the analysis engine determines 355 whether every simulation time has been simulated. If there are more simulation times to simulate, the analysis engine 210 determines 357 the next simulation time (e.g., $t_1$ of FIG. 5) and simulates the design for the determined next simulation time. This process is repeated until every simulation time has been simulated.

One problem with the simulation flow of simulation system 201A is that the second operating parameter is computed based on the results from the first analysis engine 210A, but the results of the first analysis engine 210A were calculated assuming the second operating parameter being constant. As the second analysis engine 210B computes the second operating parameter, the values of the first parameter calculated by the first analysis engine 210A becomes invalid, reducing the accuracy of the simulation results of the simulation system 201A.

Concurrent Analysis of Multiple Parameters

Figure 2B:
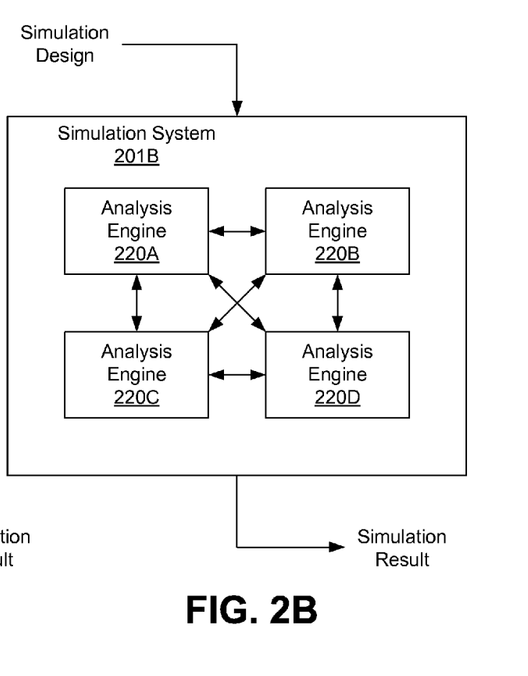
FIG. 2B illustrates a simulation system for concurrently simulating multiple operating parameters of an electrical circuit, according to one embodiment.

FIG. 2B illustrates a simulation system 201B for concurrently simulating multiple parameters of an electrical circuit, according to one embodiment. Simulation system 201B includes analysis engine 220A, analysis engine 220B, analysis engine 220C, and analysis engine 220D. For illustration purposes, FIG. 2B contains four analysis engines, but it could contain more analysis engines or less analysis engines depending on the number of operating parameters to be simulated.

Each analysis engine 220 computes its respective operating parameter and updates the environmental parameters of other analysis engines 220 accordingly. For instance, a thermal analysis engine 220 may compute the temperature profile within an electrical circuit and updates other analysis engines (e.g., timing analysis engine, power analysis engine, etc.) of the changes in temperature throughout the electrical circuit. Every analysis engine 220 performs its respective analysis of the electrical circuit concurrently. That is, before the next simulation time $t_{n+1}$ is analyzed, every operating parameter of the electrical circuit for the current simulation time $t_n$ is calculated. When every operating parameter for the current simulation time $t_n$ has been calculated, the environmental parameters for every analysis engine are updated and the operating parameters for the next simulation time $t_{n+1}$ are calculated.

The simulation system 201B beneficially improves the accuracy of the simulation results since environmental parameters are updated while each analysis engine is calculating their respective operating parameters of the simulated design.

Figure 4:
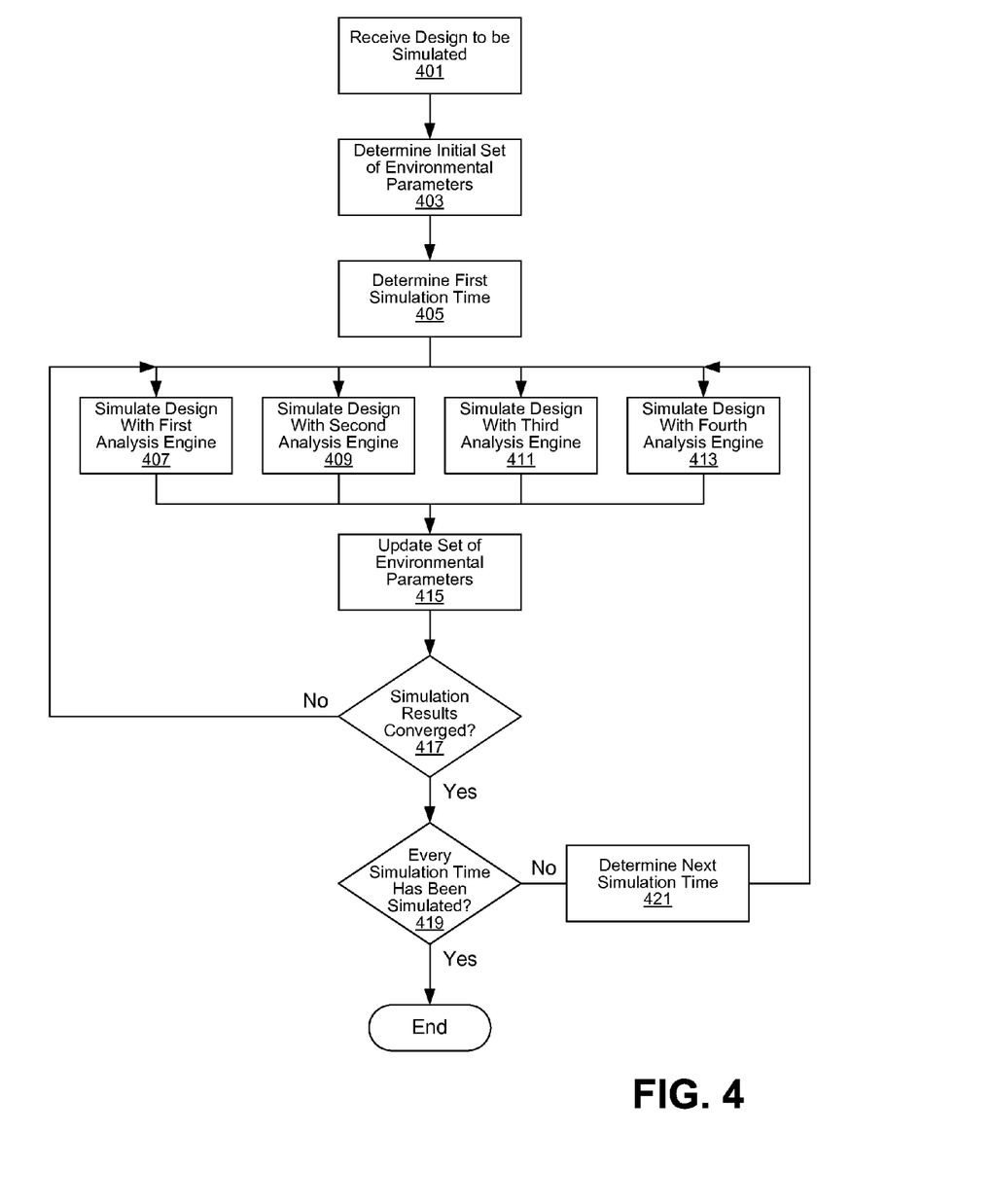
FIG. 4 illustrates a flow diagram for concurrently simulating multiple operating parameters of an electrical circuit, according to one embodiment.

FIG. 4 illustrates a flow diagram for concurrently simulating multiple operating parameters by a simulation system 210B, according to one embodiment. The simulation system 210B receives 401 the design to be simulated. The simulation system 210B determines 403 an initial value for the environmental parameters. In one embodiment, the simulation system 210B determines the initial value for the environmental parameters based on an initial value of each of the operation parameters determined by each simulation engine 220. Each analysis engine 220 may determine an initial value of their respective operating parameter based on an initial guess of the environmental parameters.

The simulation system 201B determines the first simulation time (e.g., $t_0$ of FIG. 5). Each simulation engine determines a first value of their respective operating parameters. That is, if four analysis engines 220A, 220B, 220C, and 220D are used to analyze the design, the first analysis engine 220A analyzes 407 the received design to determine a first value of the first operating parameter, the second analysis engine 220B analyzes 409 the received design to determine a first value of the second operating parameter, the third analysis engine 220C analyzes 411 the design to determine a first value of the third operating parameter, and the fourth analysis engine 220D analyzes 413 the design to determine a first value of the fourth operating parameter.

The simulation system 201B updates 415 the set of environmental parameters based on the results of each of the analysis engines and determines 417 whether the simulation results converged. If the simulation results did not converge, each of the analysis engines repeat the analysis of the design for the same simulation time using the updated set of environmental parameters. This process is repeated until the simulation system determines that the simulation results for every analysis engine 220 have converged.

As used herein, a simulation result is determined to be convergent if the result from the current analysis is within a threshold value of the results of the previous analysis for the same simulation time. For example, a thermal analysis engine may perform a first analysis of a design, for a given simulation time ($t_n$), and determine that the temperature of a component is 35.00° C. Then, for the same simulation time ($t_n$), the thermal analysis engine may perform a second analysis and determine that the temperature of the component is 35.10° C. If the convergence threshold is set at 0.05° C., then the simulation results of the thermal analysis engine is not convergent. The thermal analysis engine can then perform a third analysis of the design and determine that the temperature of the component is 35.07° C. Since the difference between the second simulation result (35.10° C.) and the third simulation result (35.07° C.) is less than the convergence threshold (0.05° C.), then the simulation results for the thermal analysis engine are considered to be convergent for the current simulation time ($t_n$). In some embodiments, the simulation results are only considered to be convergent if all simulation results from all the analysis engines 220 are convergent.

After the simulation results for the current simulation time have converged, the simulation system 201B determines 419 whether every simulation time has been simulated. If every simulation time has been simulated, then the simulation of the received design ends. Otherwise, if there are more simulation times to be simulated, the simulation system 201B determines 421 the next simulation times and repeats the simulation process for the next simulation time.

Since environmental parameters of analysis engines 220 that are simulated by an analysis engine 220 of simulation system 201B are not kept constant, the accuracy of the simulation results of simulation system 201B is improved compared to the simulation results of simulation system 201A.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or"

refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for concurrently simulating multiple parameters of an electrical circuit design through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for concurrently simulating multiple parameters of a design of an electrical circuit comprising:
   receiving a first simulation window, the first simulation window comprising a plurality of simulation times;
   identifying a first simulation time from the plurality of simulation times; and
   simulating, by a computer, the design for the determined first simulation time, wherein simulating a design comprises:
      determining a first set of environmental parameters of the design for the determined first simulation time,
      analyzing the design for the determined first simulation time and based on the determined first set of environmental parameters using a plurality of analysis engines, each of the plurality of analysis engines configured to determine at least one parameter of the design,
      determining a second set of environmental parameters based on results from the analysis of the design, and
      responsive to determining that the analysis of the design has not converged, analyzing the design for the determined first simulation time and based on the second set of environmental parameters using the plurality of analysis engines.

2. The method of claim 1, further comprising:
   responsive to determining that the analysis of the design has converged:
      identifying a second simulation time from the plurality of simulation times, and
      simulating the design for the determined second simulation time.

3. The method of claim 1, wherein determining that the analysis of the design has not converged comprises determining that the parameters from the second set of environmental parameters are not within a threshold value from the parameters from the first set of environmental parameters.

4. The method of claim 1, wherein the plurality of analysis engines includes at least one of a timing analysis engine, a power analysis engine, a voltage analysis engine, a current analysis engine, and a temperature analysis engine.

5. The method of claim 1, wherein the design is a digital representation of an electrical circuit.

6. A non-transitory computer readable medium configured to store instructions for concurrently simulating multiple parameters of a design of an electrical circuit, the instructions when executed by a processor cause the processor to:
   receive a first simulation window, the first simulation window comprising a plurality of simulation times;
   identify a first simulation time from the plurality of simulation times; and
   simulate the design for the determined first simulation time, wherein the step of simulating the design causes the processor to:
      determine a first set of environmental parameters of the design for the determined first simulation time;
      analyze the design for the determined first simulation time and based on the determined first set of environmental parameters using a plurality of analysis engines, each of the plurality of analysis engines configured to determine at least one parameter of the design,
      determine a second set of environmental parameters based on results from the analysis of the design, and
      responsive to determining that the analysis of the design has not converged, analyze the design for the determined first simulation time and based on the second set of environmental parameters using the plurality of analysis engines.

7. The computer readable medium of claim 6, further comprising instructions that cause the processor to:
   responsive to determining that the analysis of the design has converged:
      identify a second simulation time from the plurality of simulation times, and simulate the design for the determined second simulation time.

8. The computer readable medium of claim 6, wherein the step for determining that the analysis of the design has not converged comprises instructions that cause the processor to determine that the parameters from the second set of environmental parameters are not within a threshold value from the parameters from the first set of environmental parameters.

9. The computer readable medium of claim 6, wherein the plurality of analysis engines includes at least one of a timing analysis engine, a power analysis engine, a voltage analysis engine, a current analysis engine, and a temperature analysis engine.

10. The computer readable medium of claim 6, further wherein the design is a digital representation of an electrical circuit.

11. A system for concurrently simulating multiple parameters of a design of an electrical circuit comprising:
   a computer processor; and
   a non-transitory computer readable storage medium storing instruction, the instructions when executed by the processor cause the processor to:
      receive a first simulation window, the first simulation window comprising a plurality of simulation times;
      identify a first simulation time from the plurality of simulation times; and
      simulate the design for the determined first simulation time, wherein the step of simulating the design causes the processor to:
         determine a first set of environmental parameters of the design for the determined first simulation time;
         analyze the design for the determined first simulation time and based on the determined first set of environmental parameters using a plurality of analysis engines, each of the plurality of analysis engines configured to determine at least one parameter of the design, determine a second set of environmental parameters based on results from the analysis of the design, and responsive to determining that the analysis of the design has not converged, analyze the design for the determined first simulation time and based on the second set of environmental parameters using the plurality of analysis engines.

12. The system of claim 11, wherein the computer readable medium further comprises instructions that cause the processor to:

responsive to determining that the analysis of the design has converged:
identify a second simulation time from the plurality of simulation times, and simulate the design for the determined second simulation time.

13. The system of claim 11, wherein the step for determining that the analysis of the design has not converged comprises instructions that cause the processor to determine that the parameters from the second set of environmental parameters are not within a threshold value from the parameters from the first set of environmental parameters.

14. The system of claim 11, wherein the plurality of analysis engines includes at least one of a timing analysis engine, a power analysis engine, a voltage analysis engine, a current analysis engine, and a temperature analysis engine.

15. The system of claim 11, further wherein the design is a digital representation of an electrical circuit.

16. A computer-implemented method for concurrently simulating multiple parameters of a design of an electrical circuit comprising:

receiving a first simulation window, the first simulation window comprising a plurality of simulation times; and simulating, by a computer, the design for a first simulation time of the plurality of simulation times comprising:

determining a first set of environmental parameters of the design for the first simulation time of the plurality of simulation times;

analyzing, using a first analysis engine, the design for the first simulation time and based on the determined first set of environmental parameters to determine a first value of a first operating parameter;

analyzing, using a second analysis engine, the design for the first simulation time and based on the determined first set of environmental parameters to determine a first value of a second operating parameter;

determine a second set of environmental parameters based on the first value of the first parameter and the first value of the second parameter; and responsive to determining that the simulation of the design has not converged:

analyzing, using the first analysis engine, the design for the first simulation time and based on the second set of environmental parameters to determine a second value of the first operating parameter; and analyzing, using the second analysis engine, the design for the first simulation time and based on the second set of environmental parameters to determine a second value of the second operating parameter.

17. The method of claim 16, further comprising:
responsive to determining that the simulation of the design has converged, simulating the design for a second simulation time of the plurality of simulation times.

18. The method of claim 16, wherein the first set of environmental parameters is a subset of all possible environmental parameters for the first analysis engine.

19. The method of claim 16, wherein the first set of environmental parameters is a subset of all possible environmental parameters for the second analysis engine.

20. The method of claim 16, wherein the first analysis engine and the second analysis engine include at least one of a timing analysis engine, a power analysis engine, a voltage analysis engine, a current analysis engine, and a temperature analysis engine.

* * * * *